United States Patent [19]

Landoll

[11] 4,243,802

[45] Jan. 6, 1981

[54] SURFACTANT-SOLUBLE CELLULOSE DERIVATIVES

[75] Inventor: Leo M. Landoll, Wilmington, Del.

[73] Assignee: Hercules Incorporated, Wilmington, Del.

[21] Appl. No.: 45,819

[22] Filed: Jun. 6, 1979

[51] Int. Cl.$^3$ ............................................. C08B 11/193
[52] U.S. Cl. ........................................ 536/91; 536/87; 536/88; 536/90
[58] Field of Search ......................... 536/91, 87, 88, 90

[56] References Cited

U.S. PATENT DOCUMENTS

| | | | |
|---|---|---|---|
| 2,010,818 | 8/1935 | Hahn | 536/91 |
| 3,091,542 | 5/1963 | Anderson | 536/87 |
| 3,272,640 | 9/1966 | Geurden | 260/16 |
| 3,435,027 | 3/1969 | Desmarais et al. | 536/66 |
| 3,824,085 | 7/1974 | Teng et al. | 44/7 B |
| 3,894,839 | 7/1975 | Marmer et al. | 536/66 |
| 3,960,514 | 6/1976 | Teng et al. | 44/7 B |
| 4,107,426 | 8/1978 | Gordon | 536/88 |

*Primary Examiner*—Ronald W. Griffin
*Attorney, Agent, or Firm*—William S. Alexander

[57] ABSTRACT

Cellulose ethers containing an amount of hydroxypropyl, hydroxyethyl, or methyl radicals such that they are normally water soluble are further modified with $C_{12}$ to $C_{24}$ hydrocarbon radicals to a level at which they are water insoluble. These modified ethers are soluble in surfactants and effect substantial viscosity increases in solutions of surfactants. They also are highly effective emulsifiers in aqueous systems.

5 Claims, No Drawings

SURFACTANT-SOLUBLE CELLULOSE DERIVATIVES

This invention relates to a new class of modified water-soluble polymers. Specifically, it relates to such polymers which have been modified to a state in which they are no longer water-soluble but retain solubility and exhibit useful properties in detergent systems.

Nonionic water-soluble cellulose ethers are employed in a wide variety of applications where their viscosifying powers are desired. They are widely used, e.g., as thickeners, as water retention aids, and as suspension aids in certain polymerization processes, among others. For some of these applications, specific cellulose ethers are required, but for many, different ethers can be employed, depending upon price and in many cases simply on the preference of the user. Widely used, commercially available nonionic cellulose ethers include methyl cellulose, hydroxypropyl methyl cellulose, hydroxyethyl cellulose, hydroxypropyl cellulose and ethyl hydroxyethyl cellulose.

As is generally the case with high polymers, better thickening and viscosifying efficiency is realized with higher molecular weight cellulose ethers. Production of very high molecular weight materials requires the use of more expensive cellulose furnishes such as cotton linters in lieu of the more common wood pulp types. Moreover, even when very high molecular weight furnishes are employed, the etherification process is extremely harsh on the furnish and causes significant reductions in the molecular weight of the cellulose. High viscosity solutions then become difficult to obtain without resorting to follow-up steps such as crosslinking. This is not a practical alternative with nonionic cellulosics since good crosslinking techniques are not known and those that are known are troublesome and inefficient. The only other way presently known for attaining high viscosity is to use high concentrations of the polymer. This technique is frequently inefficient, impractical, or otherwise undesirable.

Copending U.S. patent application Ser. No. 11,613, filed Feb. 12, 1979, discloses water-soluble cellulose ethers of greatly increased viscosifying power, compared to known water-soluble cellulose ethers of comparable molecular weight, comprising nonionic cellulose ethers which are further modified by substitution with specified amounts of $C_{10}$ to $C_{24}$ alkyl radicals. Such ethers are substituted with an amount of the long chain alkyl radical up to the amount which renders them water-insoluble. The thickening or viscosifying ability of these ethers on aqueous systems is increased even further in the presence of nonionic surfactants although at the higher levels of modification they are not soluble in such aqueous systems when such surfactants are present.

In accordance with this invention, a class of nonionic cellulose ethers modified with $C_{10}$ to $C_{24}$ alkyl radicals have been found which are water-insoluble but which are soluble in surfactants and surfactant systems.

The cellulose ethers of this invention are low to medium molecular weight cellulose ethers having a sufficient degree of nonionic substitution selected from the class consisting of methyl, hydroxyethyl, and hydroxypropyl radicals to cause them to be normally soluble and which are further substituted with a hydrocarbon radical having 10 to 24 carbon atoms in an amount sufficient to render them water-insoluble but less than about 8% by weight based on the total weight of the modified cellulose ether. The cellulose ether is preferably one which, prior to modification, has a molecular weight between about 20,000 and 500,000 (about 75 to 1800 D.P.) and most preferably between about 20,000 and 80,000 (75 to 300 D.P.).

Cellulose ethers have heretofore been modified with small hydrophobic groups such as ethyl, butyl, benzyl and phenylhydroxyethyl groups. Such modifications or such modified products are shown in U.S. Pat. Nos. 3,091,542; 3,272,640; and 3,435,027 inter alia. These modifications are usually effected for the purpose of reducing the hydrophilicity and thus reducing the hydration rate of the cellulose ether. These modifiers have not been found to effect the property improvements caused by the modifications contemplated by this invention. This is to say, there is no significant alteration of the rheological properties or the surface-active properties of the ether. Another modification of water-soluble cellulose derivatives is shown in U.S. Pat. Nos. 3,824,085 and 3,960,514. These patents disclose hydroxypropyl cellulose laurate and the use thereof for gelling hydrocarbons. The degree of substitution of these products is quite high and they are not water-soluble nor capable of affecting the viscosity of aqueous systems.

Any nonionic water-soluble cellulose ether can be employed as the cellulose ether substrate to form the products of this invention. Thus, e.g., hydroxyethyl cellulose, hydroxypropyl cellulose, methyl cellulose, hydroxypropyl methyl cellulose, ethyl hydroxyethyl cellulose, and methyl hydroxyethyl cellulose can all be modified. The amount of nonionic substituent such as methyl, hydroxyethyl or hydroxypropyl does not appear to be critical so long as there is sufficient to assure that the ether is initially water-soluble.

The modified cellulose ethers of this invention are described as being water-insoluble. In the context of this invention, water-insoluble means soluble to the extent of less than 1% by weight or yielding a swollen gel at greater than 1% concentration in water. Materials of greater water solubility are frequently not soluble in surfactant systems and they form hazy or cloudy mixtures.

Modifier content (wt. %) is determined using a modified Zeisel method. Ether-bound hydrophobe is cleaved by use of 35% HBr in acetic acid. Brominated hydrocarbon reaction product is extracted with hexane and analyzed via a temperature programmed flame ionization instrument.

The weight percent of modifier at which the cellulose ether becomes water insoluble is influenced principally by the size of the long chain alkyl modifier and to a lesser extent by the molecular weight and the hydrophilicity of the cellulose ether substrate. The amount of modifier is best expressed in terms of the average number of modifiers per polymer chain. It has been experimentally determined that for all nonionic water-soluble cellulose ethers, the relationship between the amount which results in insolubility ($N_{INS}$) and modifier carbon number $C_n$ is defined by the formula:

$$\log N_{INS} = K - 0.07 \pm 0.005 C_N$$

The constant K varies from 1.4 to 2.1 and is a function of the hydrophilicity of the cellulose ether substrate. K is about 1.5 to 1.8 for methyl cellulose, about 1.9 to 2.2 for hydroxyethyl cellulose and hydroxypropyl methyl cellulose.

Overall, $N_{INS}$ varies from about 1 to 25. A range can be calculated within this overall range for each water-soluble cellulose ether which is usable in the invention. Thus, for methyl cellulose (K=1.8) $N_{INS}$ is about 13 when a $C_{10}$ hydrocarbon modifier is employed and about 3 when the modifier has 20 carbon atoms. $N_{INS}$ for medium D.P. hydroxyethyl cellulose is about 25 with a $C_{10}$ hydrocarbon modifier and about 5 with a $C_{20}$ modifier.

Solubility in surfactants is observed in an aqueous solution thereof of about 5% by weight surfactant concentration and greater, preferably 5 to 40% by weight solutions of the surfactant. The limits of concentration of modified cellulose ether in the surfactant solution are related to the concentration of surfactant. In general, solubility appears to require a ratio of surfactant to cellulose ether of at least about 5 to 1.

The modified cellulose ethers are soluble in all classes of water-soluble surfactants and aqueous solutions thereof. They are soluble in all nonionic, cationic, anionic and amphoteric surfactants which have water solubility greater than 5 grams per 100 grams water. Exemplary of surfactant types that can be used within the various classes are the fatty acid esters of sorbitan, ethoxylated or propoxylated sorbitan esters, ethylene and propylene glycol fatty acid esters, monoesters of glycerine, polyoxyethylene derivatives of lanolin, polyoxyethylene esters of resin acids, alkyl and aryl sulfonates, triethanolamine fatty acid esters and salts, alkali metal lauryl sulfates, long chain alkyl quaternary salts, and alkali metal salts of unsaturated fatty acids.

The long chain alkyl modifier can be attached to the cellulose ether substrate via an ether, ester or urethane linkage. Preferred is the ether linkage as the reagents most commonly used to effect etherification are readily obtained, the reaction is similar to that commonly used for the initial etherification, and the reagents are usually more easily handled than the reagents employed for modification via the other linkages. The resulting linkage is also usually more resistant to further reactions.

Methods of preparing mixed ethers of cellulose, i.e., products having more than one etherifying modifier attached to the same cellulose molecule, are known to the art. The products of this invention can be prepared via essentially the same methods. Briefly, the preferred procedure for preparing the mixed ethers of this invention comprises slurrying the nonionic cellulose ether in an inert organic diluent such as a lower aliphatic alcohol, ketone, or hydrocarbon and adding a solution of alkali metal hydroxide to the resultant slurry at a low temperature. When the ether is thoroughly wetted and swollen by the alkali, a $C_{10}$ to $C_{24}$ halide, preferably a bromide, is added and the reaction is continued, with agitation, until complete. Residual alkali is then neutralized and the product is recovered, washed with inert diluents, and dried. The etherification can also be effected with a $C_{10}$ to $C_{24}$ epoxide or halohydride but these are sometimes less reactive, less efficient.

Substantially the same preferred procedure is used to attach the hydrocarbon modifier via the ester or urethane linkage. Conventional slurry methods of reacting this type of modifier with cellulose ethers, i.e., without the alkali, are ineffective. The alkali steep is required in order to assure that the cellulose ether is swollen to the point that the modifier can react substantially uniformly on all cellulose ether molecules throughout. If reaction is not substantially uniform throughout the cellulose ether mass, the improved rheological properties are not realized.

Although the products of this invention are referred to as being "long chain alkyl group modified", it will be recognized that except in the case where modification is effected with an alkyl halide, the modifier is not a simple long chain alkyl group. The group is actually an alphahydroxyalkyl radical in the case when an epoxide is used, a urethane radical in the case of an isocyanate, or an acyl radical in the case of an acid or acyl chloride. Nonetheless, the terminology "long chain alkyl group" is used since the size and effect of the hydrocarbon portion of the modifying molecule substantially obscures any noticeable effect from the connecting group. Properties are not significantly different from those of the product modified with the simple long chain alkyl group.

EXAMPLE 1

A slurry of 80 parts by weight of medium viscosity hydroxyethyl cellulose (2.5 M.S.) in 393 parts isopropanol was prepared and degassed by sparging with $N_2$. To this was added 72 parts of an aqueous 35.5% NaOH solution. This was agitated at 0° to 5° C. in an nitrogen atmosphere. After about 16 hours, 45 parts of $C_{16}$ epoxide was charged to the slurry. The temperature was raised to 75° C. and reaction was allowed to continue for six hours.

The reaction mass was neutralized with $HNO_3$, after which the pH was adjusted to 7 with acetic acid. The product was isolated by filtration and washed with 330 parts hexane. Hexane was removed and the modified polymer was dissolved in 80/20 methanol/water. The polymer was precipitated with acetone, separated from the liquids and washed with acetone until it was hard enough to be filtered, then dried overnight at room temperature.

The modified product contained 2.68% $C_{16}$ modifier and was less than 1% soluble in water.

EXAMPLE 2

Low viscosity hydroxyethyl cellulose was treated as set forth in Example 1 except that only 23 parts of the $C_{16}$ epoxide was used.

The modified product contained 6.3% of $C_{16}$ modifier and was less than 1.3% soluble in water.

EXAMPLE 3

A slurry of 80 parts by weight of low viscosity hydroxyethyl cellulose in isopropanol was prepared and degassed by sparging with nitrogen. To this was added 72 parts of 35.5% NaOH solution. This was agitated for about 16 hours at 0° to 5° C., at which time 45 parts of $C_{16}$ epoxide was added and the temperature was raised to 75° C. for 3.5 hours.

The reaction mass was neutralized with nitric acid and the pH was adjusted to about 7 with acetic acid. The polymer was removed from the isopropanol reaction medium and washed several times with hexane. Following removal of the hexane, the polymer was dissolved in 90/10 methanol/water mixture and the polymer was reprecipitated with hexane. The hexane was removed by decantation and the polymer was washed with acetone until it was hardened sufficiently to be vacuum filtered. Residual acetone was removed by drying the polymer overnight under vacuum at room temperature.

The modified polymer contained 3.05% $C_{16}$ modifier and was less than 1% soluble in water.

EXAMPLE 4

A solution (10 g.) of low molecular weight hydroxyethyl cellulose (2.5 M.S.) in 190 g. distilled dimethyl sulfoxide (DMSO) was sparged with nitrogen to remove oxygen. To this was added 0.9 gram potassium t-butoxide in 15 ml. distilled DMSO.

A dispersion of 0.4 g. of $C_{16}$ epoxide in 5 ml. of DMSO was rapidly added with stirring to the reaction mixture at room temperature. The temperature was raised to 80° C. over 40 minutes and held there for 3 hours. At the end of the reaction period, the mass had the appearance of a thick gel. This was allowed to cool to room temperature and to stand overnight.

Acetone was added to the reaction mass and it was ground in a sealed blender. This step was repeated three times with the acetone removed by decantation after each grinding. Finally, the solids were added to a large volume of acetone stirred by a Cowles blade for 30 minutes, then recovered by suction filtration and air dried.

The modified ether contained 3.5% by weight of the $C_{16}$ modifier and was less than 1% soluble in water.

EXAMPLE 5

The procedure of Example 4 was repeated using 2 g. of the $C_{16}$ epoxide to produce a modified product containing about 5.8% modifier.

EXAMPLE 6

A slurry of 80 parts by weight of low viscosity hydroxyethyl cellulose in 393 parts of isopropanol was prepared and degassed by sparging with nitrogen. To this was added 72 parts of 35.5% aqueous NaOH solution. This was agitated for about 16 hours at 0° to 5° C. 36 grams of $C_{12}$ epoxide was added. The temperature was raised to about 70° to 75° C. and reaction was allowed to proceed for 3.5 hours with constant agitation under an argon blanket.

The reaction mass was cooled to room temperature and neutralized to about pH 7 with nitric acid and then acetic acid. Removed from the isopropanol, the polymer was washed twice with hexane, then twice with 20% aqueous acetone, then dried under vacuum at room temperature.

The modified polymer contained 2.42% $C_{12}$ modifier and was less than 1% soluble in water.

EXAMPLE 7

The procedure set forth in Example 6 was repeated except the reaction was carried on for 4.5 hours. The water-insoluble product contained 3.4% $C_{12}$ modifier.

EXAMPLE 8

The procedure of Example 6 was repeated using a $C_{14}$ epoxide, allowing the reaction to proceed for 3.5 hours. The water-insoluble product contained 2.44% $C_{14}$ modifier.

EXAMPLE 9

Example 8 was repeated, allowing 5 hours' reaction time. The water-insoluble product contained 2.75% $C_{14}$ modifier.

The solubility of the modified cellulose ethers of the invention makes them useful as viscosifiers for shampoo formulations where many conventional water-soluble gums are not compatible. For example, the current trend in shampoos is toward low pH, low eye irritation products. This has necessitated the elimination from the formulations of salts and amides which have been employed heretofore as viscosifying constituents. The incompatibility of conventional gums, as, e.g., hydroxyethyl cellulose, makes these formulations particularly difficult to viscosify. The modified cellulose ethers of this invention are compatible with surfactants in the concentrations used in most shampoos and they effect substantial viscosity increases. The formulations, in most cases, are crystal clear solutions.

EXAMPLE 10

Low molecular weight hydroxypropyl cellulose was dissolved in 90% isopropanol with NaOH (1.5 N) and a hydrophobic epoxide. The thick solution was stirred for varying lengths of time, as listed in the table below, at 75° C. The product was isolated by precipitation into hexane. All products in Table 1 are water insoluble, but dissolve readily in a 10% solution of sodium tetradecyl sulfate in water.

TABLE 1

| Example | Epoxide Carbon No. | Amount (grams) | Time (hours) | Wt. % Modification |
|---|---|---|---|---|
| 10a | 12 | 20 | 3 | 1.02 |
| b | 14 | 20 | 3.75 | 1.13 |
| c | 20-24 | 20 | 4 | 1.43 |
| d | 16 | 20 | 3 | 0.93 |
| e | 14 | 36 | 3.5 | 1.90 |
| f | 20-24 | 40 | 3.5 | 2.75 |

EXAMPLE 11

Methyl hydroxypropyl cellulose (Methocel A4C-Dow) was modified by reswelling in a caustic isopropanol slurry at 75° C. for specified times with the levels of hydrophobic epoxide in Table 2. All of the products are water insoluble as recorded in Table 2 but dissolve readily in a 10% solution of sodium tetradecyl sulfate.

TABLE 2

| Example | Epoxide Carbon No. | Amount (grams) | Time (hours) | Wt. % Modification |
|---|---|---|---|---|
| 11a | 12 | 36 | 5.5 | 2.90 |
| b | 14 | 36 | 5.5 | 2.60 |
| c | 20-24 | 36 | 5.5 | 2.60 |

EXAMPLE 12

Example 11 was repeated substituting hydroxypropyl methyl cellulose (Methocel E-50 by Dow) for the methyl cellulose. All samples are water insoluble but soluble in 10% sodium tetradecyl sulfate.

TABLE 2

| Example | Epoxide Carbon No. | Amount (grams) | Time (hours) | Wt. % Modification |
|---|---|---|---|---|
| 12a | 12 | 36 | 3.5 | 2.80 |
| b | 14 | 36 | 3.5 | 2.60 |
| c | 15-18 | 36 | 3.5 | 2.10 |

EXAMPLE 13

A low pH shampoo formulation* consisting essentially of the following ingredients was prepared:

| | |
|---|---|
| N-carboxymethyl-N-[α-oxocarboxymethyl)-ethyl]-2-dodecyl imidazoline | 12.0 parts |
| Lauryl sulfate triethanolamine | 3.7 parts |
| Lauric diethanolamide | 5.0 parts |
| Ethyl dimethyl-(3-lanolin amide) ammonium ethyl sulfate | 12.0 parts |
| Water | 22.3 parts |
| Propylene glycol | 6.5 parts |
| Cellulose ether dispersion | 38.5 parts |

*See Soap, Cosmetics, and Chemical Specialities, July 1978

The first four ingredients and the water were blended with heating to 70° C. for 4 minutes. The water-insoluble cellulose ethers to be tested were dispersed in water at about 70° C. with stirring. The warm surfactant blend was then stirred into the warm dispersion, followed by the propylene glycol. The mass was then stirred for a time from about 15 minutes to one hour until the polymer was dissolved.

Pertinent data are recorded in the following table.

TABLE 4

| Modifier and Concentration | Polymer Conc. in Mix | Viscosity (cps.) | Appearance |
|---|---|---|---|
| None | — | 56 | Clear |
| Hydroxyethyl Cellulose | 2% | — | Incompatible |
| $C_{16}$ - 2.7% | 0.8% | 475 | Clear |
| $C_{16}$ - 2.7% | 1% | 3575 | Some haze |
| $C_{16}$ - 2.7% | 1.5% | 18,000 | Cloudy |
| $C_{16}$ - 3% | 2% | 925 | Clear |
| $C_{16}$ - 6.3% | 2% | 1,250 | Clear |
| $C_{14}$ - 2.4% | 2% | 335 | Clear |
| $C_{14}$ - 2.75% | 2% | 405 | Clear |
| $C_{12}$ - 2.4% | 2% | 330 | Clear |
| $C_{12}$ - 3.4% | 2% | 365 | Clear |

The solubility of the modified cellulose ether in the surfactants and the substantial viscosity increases resulting therefrom are clear from the data in the table.

Despite their insolubility in water, the novel cellulose ethers of the invention are, themselves, highly effective emulsifiers in aqueous systems. This behaviour is demonstrated in the next example.

EXAMPLE 14

Mixtures of 50 parts water containing 1 part of hydroxyethyl cellulose modified with $C_{16}$ hydrocarbon, and 50 parts of a water-immiscible hydrocarbon oil were prepared and homogenized vigorously with a manual homogenizer. Initially all of the systems were thoroughly and completely dispersed when transferred from the homogenizer. After one day, the unmodified hydroxyethyl cellulose emulsion had separated an oil phase. All of the modified hydroxyethyl cellulose emulsion showed no oil phase separation, although some slight variances in creaming rates were noted.

TABLE 5

| No. | Oil | Poly M.W. | % $C_{16}$ | Oil Phase Separation |
|---|---|---|---|---|
| 1 | Fractol | medium | 0 | Yes |
| 2 | Fractol | low | 0 | Yes |
| 3 | Fractol | medium | 2.01 | No |
| 4 | Fractol | medium | 4.31 | No |
| 5 | Fractol | medium | 6.7 | No |
| 6 | Fractol | low | 3.1 | No |
| 7 | Fractol | low | 5.1 | No |
| 8 | Xylene | low | 0 | Yes |
| 9 | Xylene | medium | 0 | Yes |
| 10 | Xylene | medium | 2.01 | No |
| 11 | Xylene | medium | 4.31 | No |
| 12 | Xylene | medium | 6.7 | No |
| 13 | Xylene | low | 3.1 | No |
| 14 | Xylene | low | 5.1 | No |
| 15 | Pine oil | low | 0 | Yes |
| 16 | Pine oil | medium | 0 | Yes |
| 17 | Pine oil | medium | 2.01 | No |
| 18 | Pine oil | medium | 4.31 | No |
| 19 | Pine oil | medium | 6.7 | No |
| 20 | Pine oil | low | 3.1 | No |
| 21 | Pine oil | low | 5.1 | No |

What I claim and desire to protect by Letters Patent is:

1. A cellulose ether having a sufficient degree of nonionic substitution selected from the class consisting of methyl, hydroxyethyl, and hydroxypropyl radicals to cause it to be normally soluble in water and which is further substituted with a long chain alkyl radical having 10 to 24 carbon atoms in an amount between that which renders said ether water-insoluble and about 8% by weight based on the total weight of the modified cellulose ether.

2. A water-insoluble cellulose ether of claim 1 wherein the normally soluble cellulose ether prior to modification has a D.P. of about 75 to 1800.

3. A cellulose ether of claim 2 wherein the nonionic substitution is comprised of the hydroxyethyl radical.

4. A cellulose ether of claim 2 wherein the nonionic substitution is comprised of the hydroxypropyl radical.

5. A cellulose ether of claim 2 wherein the nonionic substitution is comprised of the methyl radical.

* * * * *